United States Patent
Ohashi

(10) Patent No.: US 12,025,597 B2
(45) Date of Patent: Jul. 2, 2024

(54) LIQUID CHROMATOGRAPH MANAGING INTERNAL CAPACITY OF MIXER

(71) Applicant: SHIMADZU CORPORATION, Kyoto (JP)

(72) Inventor: Hiroshi Ohashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 302 days.

(21) Appl. No.: 17/435,958

(22) PCT Filed: Oct. 15, 2019

(86) PCT No.: PCT/JP2019/040447
§ 371 (c)(1),
(2) Date: Sep. 2, 2021

(87) PCT Pub. No.: WO2020/179119
PCT Pub. Date: Sep. 10, 2020

(65) Prior Publication Data
US 2022/0146472 A1    May 12, 2022

(30) Foreign Application Priority Data
Mar. 6, 2019   (JP) .................. 2019-040246

(51) Int. Cl.
*G01N 30/30* (2006.01)
*G01N 30/34* (2006.01)
(Continued)

(52) U.S. Cl.
CPC ......... *G01N 30/8651* (2013.01); *G01N 30/30* (2013.01); *G01N 30/34* (2013.01);
(Continued)

(58) Field of Classification Search
None
See application file for complete search history.

(56) References Cited

U.S. PATENT DOCUMENTS 5,690,893 A * 11/1997 Ozawa ............. G01N 35/00732
422/63
2009/0288473 A1 * 11/2009 Suzuki ............... G01N 30/8665
73/23.41

(Continued)

FOREIGN PATENT DOCUMENTS

JP             543068   *  1/1979
JP        62-226999 A    10/1987
(Continued)

OTHER PUBLICATIONS

Office Action for corresponding Chinese Patent Application No. 201980093447.9 dated Jul. 4, 2023, with English machine translation.

(Continued)

*Primary Examiner* — Brandi N Hopkins
*Assistant Examiner* — Nigel H Plumb
(74) *Attorney, Agent, or Firm* — Renner, Otto, Boisselle & Sklar, LLP

(57) ABSTRACT

A liquid chromatograph includes a liquid sender that sends a plurality of solvents, a mixer that has an internal capacity for mixing the plurality of solvents sent by the liquid sender, a sample injector that injects a sample into an analysis flow path through which the solvents mixed in the mixer flow as a mobile phase, a separation column provided on the analysis flow path for separating the sample injected by the sample injector to each component, a detector provided downstream of the separation column on the analysis flow path for detecting the components of the sample separated in the separation column, a capacity information storage medium that is attached to the mixer to store information as to the internal capacity of the mixer, configured to read the information stored in the capacity information storage medium to specify the internal capacity of the mixer.

6 Claims, 2 Drawing Sheets

(51) Int. Cl.
*G01N 30/86* (2006.01)
*G01N 30/02* (2006.01)

(52) U.S. Cl.
CPC .......... *G01N 2030/027* (2013.01); *G01N 2030/3084* (2013.01); *G01N 2030/347* (2013.01)

(56) References Cited

U.S. PATENT DOCUMENTS

| | | |
|---|---|---|
| 2012/0222470 A1 | 9/2012 | Suzuki |
| 2018/0088091 A1* | 3/2018 | Cormier ................ G01N 30/32 |
| 2020/0033302 A1* | 1/2020 | Yasunaga ............... G01N 30/20 |
| 2021/0208114 A1 | 7/2021 | Cormier |

FOREIGN PATENT DOCUMENTS

| | | | |
|---|---|---|---|
| JP | 62226999 | * | 10/1987 |
| JP | 05-043068 U | | 6/1993 |
| JP | 08-054399 A | | 2/1996 |
| JP | 2009-281897 A | | 12/2009 |
| JP | 2017-116350 A | | 6/2017 |
| JP | 2018-51476 A | | 6/2018 |
| JP | 2018514761 | * | 6/2018 |
| WO | 2017/006410 A1 | | 1/2017 |

OTHER PUBLICATIONS

International Search Report for corresponding Application No. PCT/JP2019/040447, mailed Jan. 21, 2020.
Written Opinion for corresponding Application No. PCT/JP2019/040447, mailed Jan. 21, 2020 (machine English Translation).
Decision on Rejection in corresponding Chinese Patent Application No. 201980093447.9 dated Jan. 4, 2024, with English machine translation.

* cited by examiner

LIQUID CHROMATOGRAPH MANAGING INTERNAL CAPACITY OF MIXER

TECHNICAL FIELD

The present invention relates to a liquid chromatograph.

BACKGROUND ART

In a liquid chromatograph, a sample is injected into an analysis flow path through which a mobile phase flows, the sample injected into the analysis flow path is led to a separation column by the mobile phase and is separated for each component, and the separated components of the sample are detected by a detector (See Patent Document 1).

As the mobile phase sent in the analysis flow path, a liquid mixture of a plurality of solvents such as an aqueous solvent and an organic solvent is often used, and a gradient analysis of temporally changing a mixing ratio of those plurality of solvents is often carried out.

CITATION LIST

Patent Document

[Patent Document 1] WO 2017/006410 A1

SUMMARY OF INVENTION

Technical Problem

As described above, when the mobile phase is made up by mixing the plurality of solvents, a mixer for mixing the solvents is provided online. As the mixer used in the liquid chromatograph, there are a plurality of types of mixers with different internal capacities. Also, there is a capacity selection type mixer configured to be capable of selecting an internal capacity for use among a plurality of types of capacities to set the selected internal capacity.

It is also considered that in a liquid chromatography analysis, conditions of mixture of the solvents are different depending on the internal capacities of the mixers for use, which may affect analysis data. As such, it is preferable for a user to be able to easily recognize what internal capacity of mixer is used to acquire the analysis data in order to increase reproducibility of analysis. However, in the conventional liquid chromatograph, an analysis system could not recognize the capacity of a mixer in use for analysis, and therefore, there has been no technique of identifying what mixer has been used to acquire the analysis data unless the user oneself identified the capacity of the mixer in use.

The present invention has been made in consideration of the aforementioned problem, and an object of the present invention is to enable the analysis system to recognize the capacity of the mixer in use for analysis.

Solution to Problem

A liquid chromatograph according to the present invention includes a liquid sender that sends a plurality of solvents, a mixer that has an internal capacity for mixing the plurality of solvents sent by the liquid sender, a sample injector that injects a sample into an analysis flow path through which the solvents mixed in the mixer flow as a mobile phase, a separation column provided on the analysis flow path to separate the sample injected by the sample injector to each component, a detector provided downstream of the separation column on the analysis flow path to detect the components of the sample separated in the separation column, a capacity information storage medium that is attached to the mixer to store information as to the internal capacity of the mixer, and a capacity specifier configured to read the information stored in the capacity information storage medium to specify the internal capacity of the mixer.

Here, the capacity information storage medium being attached to the mixer means that the capacity information storage medium such as a flash memory is directly or indirectly coupled to the mixer. The capacity information storage medium being directly coupled to the mixer means that the capacity information storage medium is firmly fixed to the mixer to be integral with each other. The capacity information storage medium being indirectly coupled to the mixer means that the capacity information storage medium is connected to the mixer by a string-shaped member or the like.

Advantageous Effects of Invention

With the liquid chromatograph of the present invention, the capacity information storage medium that stores the information as to the internal capacity of the mixer is attached to the mixer, and the liquid chromatograph includes the capacity specifier configured to read the information stored in the capacity information storage medium to specify the internal capacity of the mixer. Therefore, an analysis system can recognize the capacity of the mixer in use for analysis.

DESCRIPTION OF EMBODIMENTS

Figure 1:
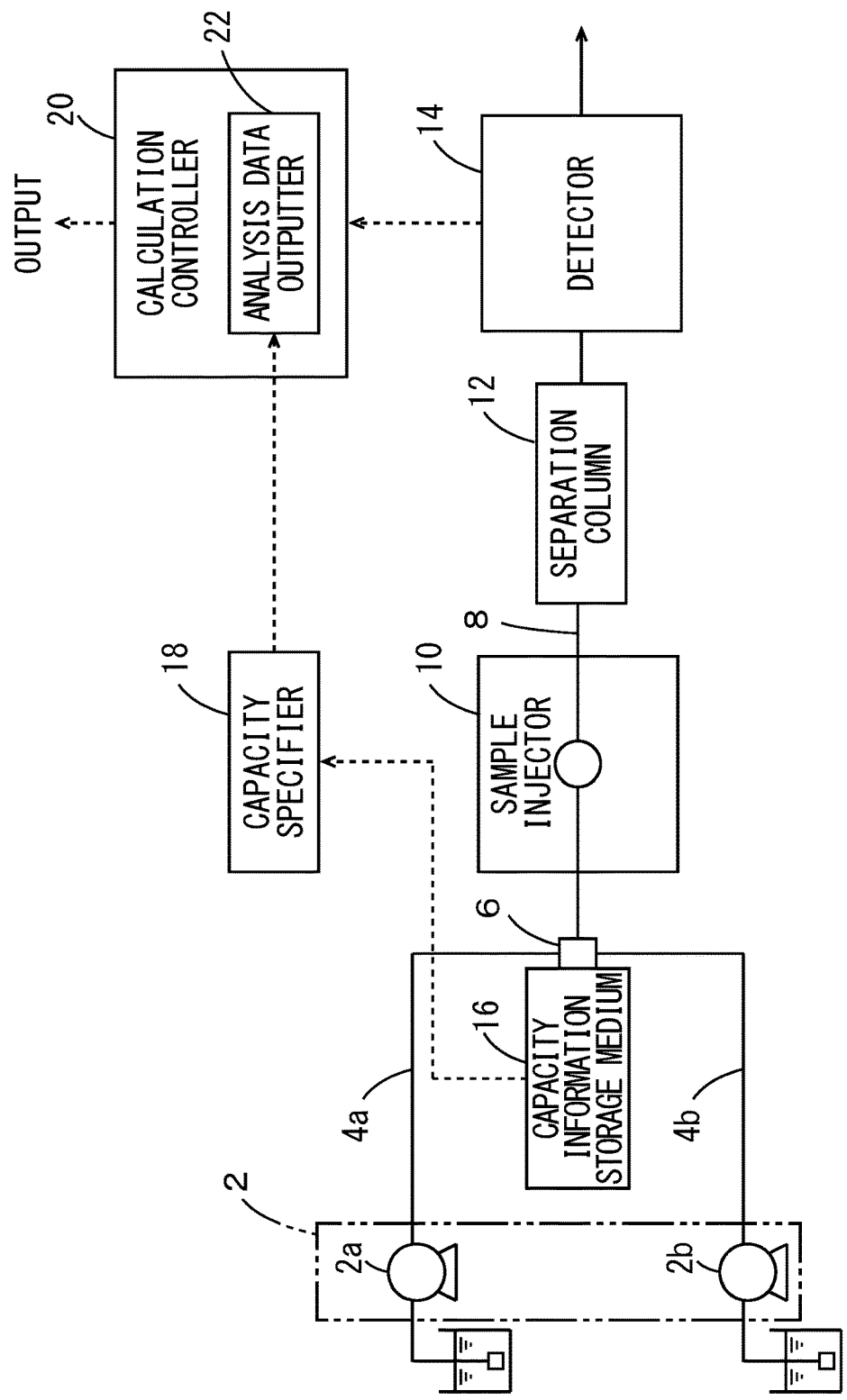
FIG. 1 is a schematic structural diagram showing an inventive example of a liquid chromatograph.

An inventive example of a liquid chromatograph will be described with reference to FIG. 1.

The liquid chromatograph of this inventive example includes a liquid sender 2, a mixer 6, an analysis flow path 8, a sample injector 10, a separation column 12, a detector 14, a capacity specifier 18, and an calculation controller 20.

The liquid sender 2 is configured to send a plurality of solvents and, in this inventive example, includes two liquid sending pumps 2a, 2b. The configuration of the liquid sender 2 is not limited to this, and the liquid sender 2 may be configured to send a plurality of solvents using one liquid sending pump.

The mixer 6 is provided downstream of the liquid sender 2 to mix a solvent sent through a flow path 4a and a solvent sent through a flow path 4b. The solvents mixed in the mixer 6 flow as a mobile phase through the analysis flow path 8.

The sample injector 10 injects a sample into the analysis flow path 8. The separation column 12 is provided downstream of the sample injector 10 on the analysis flow path 8, and the detector 14 is provided downstream of the separation column 12 on the analysis flow path 8. The sample injected into the analysis flow path 8 by the sample injector 10 is transported to the separation column 12 by the mobile phase from the mixer 6 and is separated to each component. Each sample component separated by the separation column 12 is detected by the detector 14. A detection signal of the detector 14 is incorporated in the calculation controller 20.

A capacity information storage medium 16 is attached to the mixer 6. The capacity information storage medium 16 stores information as to an internal capacity of the mixer 6. In a case where the mixer 6 is a capacity selection type mixer configured to be capable of setting to any of a plurality of types of capacities, at least information indicating that the mixer 6 is a capacity selection type mixer is stored in the capacity information storage medium 16 attached to the mixer 6. The capacity information storage medium 16 is implemented by a flash memory or the like.

Figure 2:
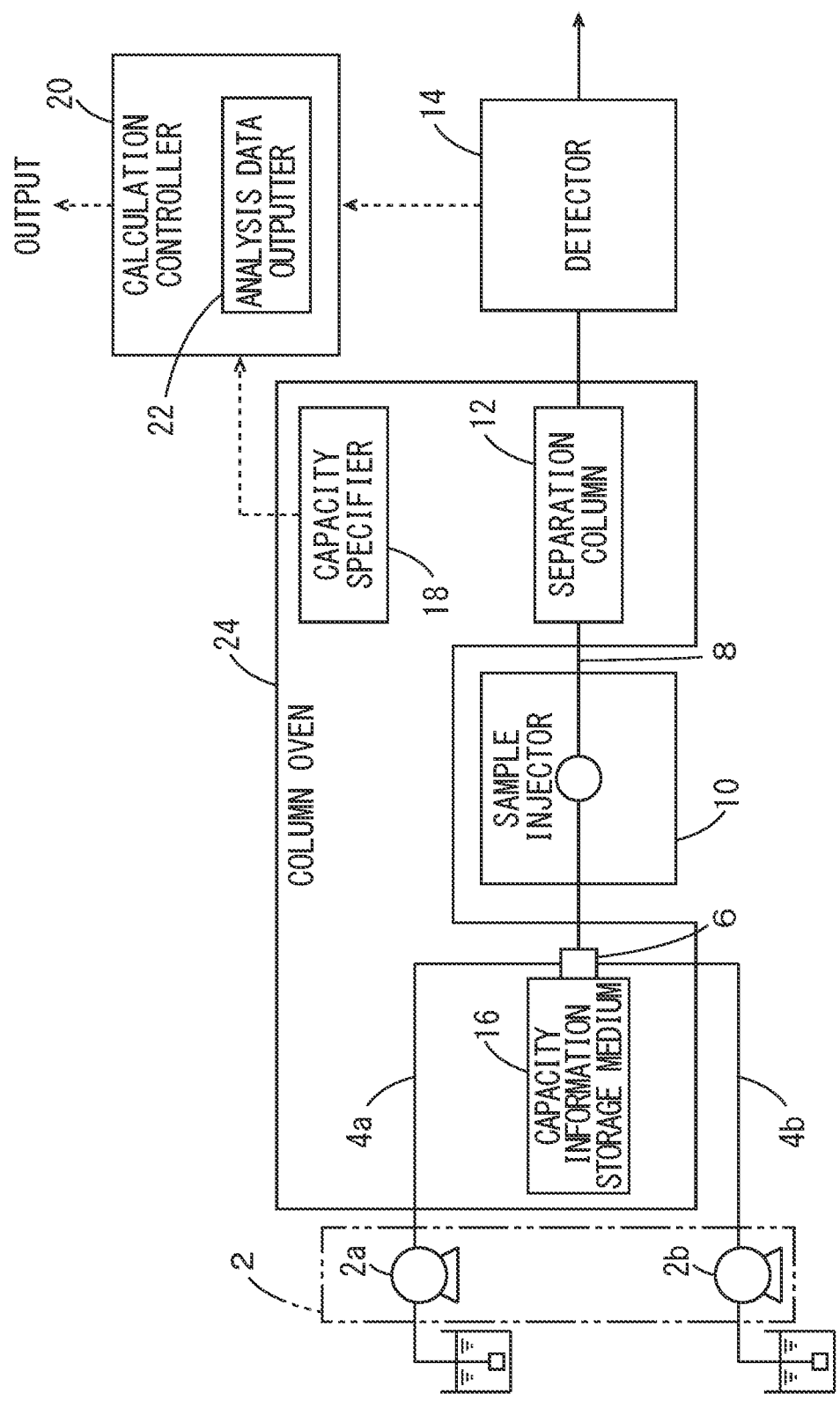
FIG. 2 is a schematic structural diagram showing another inventive example of the liquid chromatograph.

The capacity specifier 18 is implemented as a function of an electronic circuit that can perform information communication with the capacity information storage medium 16 attached to the mixer 6 incorporated in a system of this liquid chromatograph. The electronic circuit that implements the capacity specifier 18 as the function of the electronic circuit may be incorporated in an electronic circuit mounted on a module in which the mixer 6 is incorporated or may be incorporated in an electronic circuit mounted on the calculation controller 20. As the module in which the mixer 6 is incorporated, a column oven 24 for accommodating the separation column 12 therein to adjust a temperature of the separation column 12 to a predetermined temperature is presented as shown in FIG. 2. Besides, in a case where the mixer 6 is incorporated in the liquid sender 2, the capacity specifier 18 may be mounted on the liquid sender 2. In a case where the mixer 6 is incorporated in the sample injector 10, the capacity specifier 18 may be mounted on the sample injector 10.

The capacity specifier 18 is configured to read the information stored in the capacity information storage medium 16 to specify the internal capacity of the mixer 6 incorporated in the system. Also, in a case where the mixer 6 is the capacity selection type mixer, the capacity specifier 18 reads that the mixer 6 is the capacity selection type mixer from the information stored in the capacity information storage medium 16, and displays a plurality of types of capacities that can be set as the internal capacity of the mixer 6 on a display device that is electrically connected to the electronic circuit that implements the capacity specifier 18 as the function. Then, the capacity specifier 18 is configured to make a user select a capacity that is actually set as the internal capacity of the mixer 6 among the plurality of types of capacities to specify the capacity selected by the user as the internal capacity of the mixer 6. Information as to the plurality of types of capacities that can be set as the internal capacity of the mixer 6 may be stored in the capacity information storage medium 16, or alternatively, stored in a storage device incorporated in the electronic circuit that implements the capacity specifier 18 as the function.

The calculation controller 20 is implemented by a dedicated computer or a general-purpose personal computer. The calculation controller 20 includes an analysis data outputter 22 that creates analysis data such as a chromatogram using a detection signal from the detector 14 to output the analysis data. The analysis data outputter 22 is a function implemented by execution of a predetermined program in the calculation controller 20. The analysis data outputter 22 is configured to output the internal capacity of the mixer 6 specified by the capacity specifier 18 together with the analysis data. Thus, the user can easily recognize what capacity of the mixer 6 is used to acquire the analysis data.

The inventive example as explained above is merely one example of an embodiment of the liquid chromatograph according to the present invention. The embodiment of the liquid chromatograph according to the present invention is described below.

In the embodiment of the liquid chromatograph according to the present invention, the liquid chromatograph includes a liquid sender (2) that sends a plurality of solvents, a mixer (6) that has an internal capacity for mixing the plurality of solvents sent by the liquid sender (2), a sample injector (10) that injects a sample into an analysis flow path (8) through which the solvents mixed in the mixer (6) flow as a mobile phase, a separation column (12) that is provided on the analysis flow path (8) to separate the sample injected by the sample injector (10) to each component, a detector (14) that is provided downstream of the separation column (12) on the analysis flow path (8) to detect the components of the sample separated in the separation column (12), a capacity information storage medium (16) that is attached to the mixer (6) to store information as to the internal capacity of the mixer (6), and a capacity specifier (18) configured to read the information stored in the capacity information storage medium (16) to specify the internal capacity of the mixer (6).

In a first aspect of the above-described embodiment, the mixer (6) is a capacity selection type mixer (6) configured to be capable of setting the internal capacity to any of a plurality of types of capacities, the capacity information storage medium (16) stores information indicating that the mixer (6) is the capacity selection type mixer (6), the capacity specifier (18) is configured to read that the mixer (6) is the capacity selection type mixer (6) from the information stored in the capacity information storage medium (16), indicate the plurality of types of capacities that are settable as the internal capacity of the mixer (6) to a user, make the user select a capacity set as the internal capacity among the plurality of types of capacities, and specify the capacity selected by the user as the internal capacity of the mixer (6). According to such an aspect, even if the mixer (6) is the capacity selection type mixer (6), it is possible to make an analysis system recognize the capacity set as the internal capacity of the mixer (6).

In a second aspect of the above-described embodiment, the liquid chromatograph includes an analysis data outputter (22) configured to output analysis data acquired from a detection signal of the detector (14) together with the internal capacity of the mixer (6) used during the acquisition of the analysis data. According to such an aspect, the user can easily recognize the internal capacity of the mixer (6) used during the acquisition of the analysis data.

In a third aspect of the above-described embodiment, the liquid chromatograph includes a column oven (24) that accommodates the separation column (12) therein and adjusts a temperature of the separation column (12) to a predetermined temperature, the mixer (6) and the capacity information storage medium (16) are accommodated in the column oven (24), and the capacity specifier (18) is mounted on the column oven (24). It is noted that this third aspect is an example, and the mixer (6), the capacity information storage medium (16), and the capacity specifier (18) may be mounted on the liquid sender (2) or the calculation controller (20) for performing various calculation processing. Alternatively, the mixer and the capacity information storage medium may be accommodated in the liquid sender, and the capacity specifier may be mounted on the liquid sender. Alternatively, the mixer and the capacity information storage medium may be accommodated in the sample injector, and the capacity specifier may be mounted on the sample injector.

REFERENCE SIGNS LIST 2 liquid sender
2a, 2b liquid sending pumps
4a, 4b flow paths
6 mixer
8 analysis flow path
10 sample injector
12 separation column
14 detector
16 capacity information storage medium
18 capacity specifier
20 calculation controller
22 analysis data outputter
24 column oven

The invention claimed is:

1. A liquid chromatograph comprising:
a liquid sender that sends a plurality of solvents;
a mixer that has an internal capacity for mixing the plurality of solvents sent by the liquid sender;
a sample injector that injects a sample into an analysis flow path through which the solvents mixed in the mixer flow as a mobile phase;
a separation column provided on the analysis flow path for separating the sample injected by the sample injector to each component;
a detector provided downstream of the separation column on the analysis flow path for detecting the components of the sample separated in the separation column;
a capacity information storage medium that is attached to the mixer to store information as to the internal capacity of the mixer; and
a capacity specifier configured to read the information stored in the capacity information storage medium to specify the internal capacity of the mixer.

2. The liquid chromatograph according to claim 1, wherein the mixer is a capacity selection type mixer configured to be capable of setting the internal capacity to any of a plurality of types of capacities,
the capacity information storage medium stores information indicating that the mixer is the capacity selection type mixer, and
the capacity specifier is configured to read that the mixer is the capacity selection type mixer from the information stored in the capacity information storage medium, indicate the plurality of types of capacities that are settable as the internal capacity of the mixer to a user, make the user select a capacity set as the internal capacity among the plurality of types of capacities, and specify the capacity selected by the user as the internal capacity of the mixer.

3. The liquid chromatograph according to claim 1, comprising an analysis data outputter configured to output analysis data acquired from a detection signal of the detector together with the internal capacity of the mixer used during the acquisition of the analysis data.

4. The liquid chromatograph according to claim 1, comprising a column oven that accommodates the separation column in the column oven and adjusts a temperature of the separation column to a predetermined temperature,
wherein the mixer and the capacity information storage medium are accommodated in the column oven, and the capacity specifier is mounted on the column oven.

5. The liquid chromatograph according to claim 1, wherein the mixer and the capacity information storage medium are accommodated in the liquid sender, and the capacity specifier is mounted on the liquid sender.

6. The liquid chromatograph according to claim 1, wherein the mixer and the capacity information storage medium are accommodated in the sample injector, and the capacity specifier is mounted on the sample injector.

* * * * *